United States Patent [19]

Aula et al.

[11] 4,267,812
[45] May 19, 1981

[54] ENGINE EGR COOLER

[75] Inventors: Howard A. Aula; Jerry L. Mauch, both of Dearborn Heights, Mich.

[73] Assignee: Ford Motor Company, Dearborn, Mich.

[21] Appl. No.: 83,014

[22] Filed: Oct. 9, 1979

[51] Int. Cl.³ .............................................. F02B 47/08
[52] U.S. Cl. ................................ 123/570; 123/52 MV
[58] Field of Search ............. 123/119 A, 52 MV, 570

[56] References Cited

U.S. PATENT DOCUMENTS

| | | | |
|---|---|---|---|
| 3,937,196 | 2/1976 | Cook et al. | 123/119 A |
| 3,951,115 | 4/1976 | Brisko | 123/119 A |
| 3,961,616 | 6/1976 | Brown | 123/119 A |
| 4,055,158 | 10/1977 | Marsee | 123/119 A |
| 4,058,098 | 11/1977 | Onaka | 123/119 A |
| 4,072,133 | 2/1978 | McWhirter | 123/119 A |
| 4,094,283 | 6/1978 | Sutton | 123/119 A |
| 4,119,071 | 10/1978 | Hattori | 123/119 A |
| 4,147,141 | 4/1979 | Nagano | 123/119 A |
| 4,192,266 | 3/1980 | Duckworth | 123/119 A |

Primary Examiner—Wendell E. Burns
Attorney, Agent, or Firm—Robert E. McCollum; Clifford L. Sadler

[57] ABSTRACT

An automotive type exhaust gas recirculation (EGR) cooler or heat exchanger that is constructed for integral mounting to the engine intake manifold, the cooler being flat and having an engine coolant inlet at one end of an oblong casing and a coolant outlet at the other end to flow coolant past a U-shaped tube containing EGR gases to be cooled.

6 Claims, 14 Drawing Figures

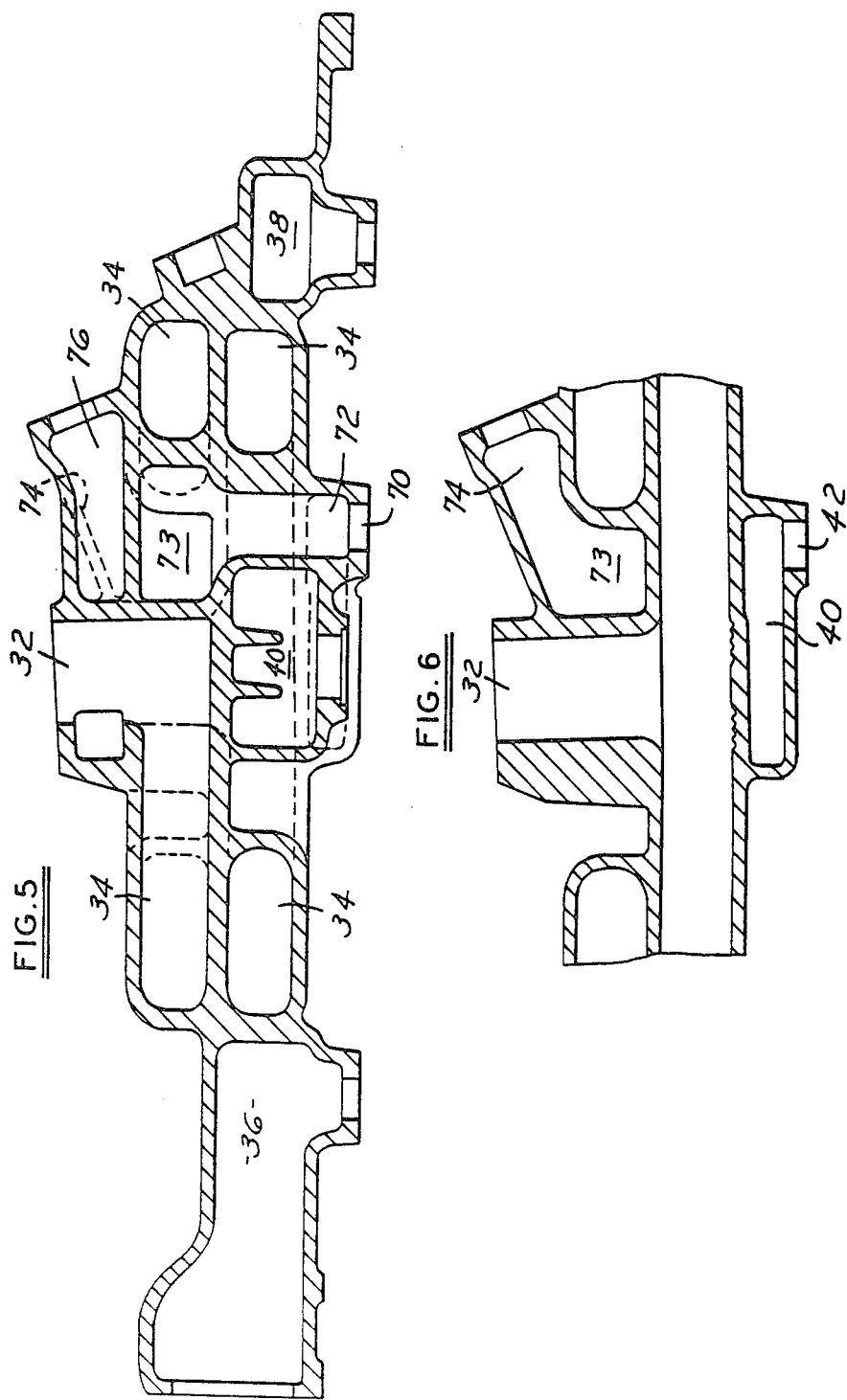

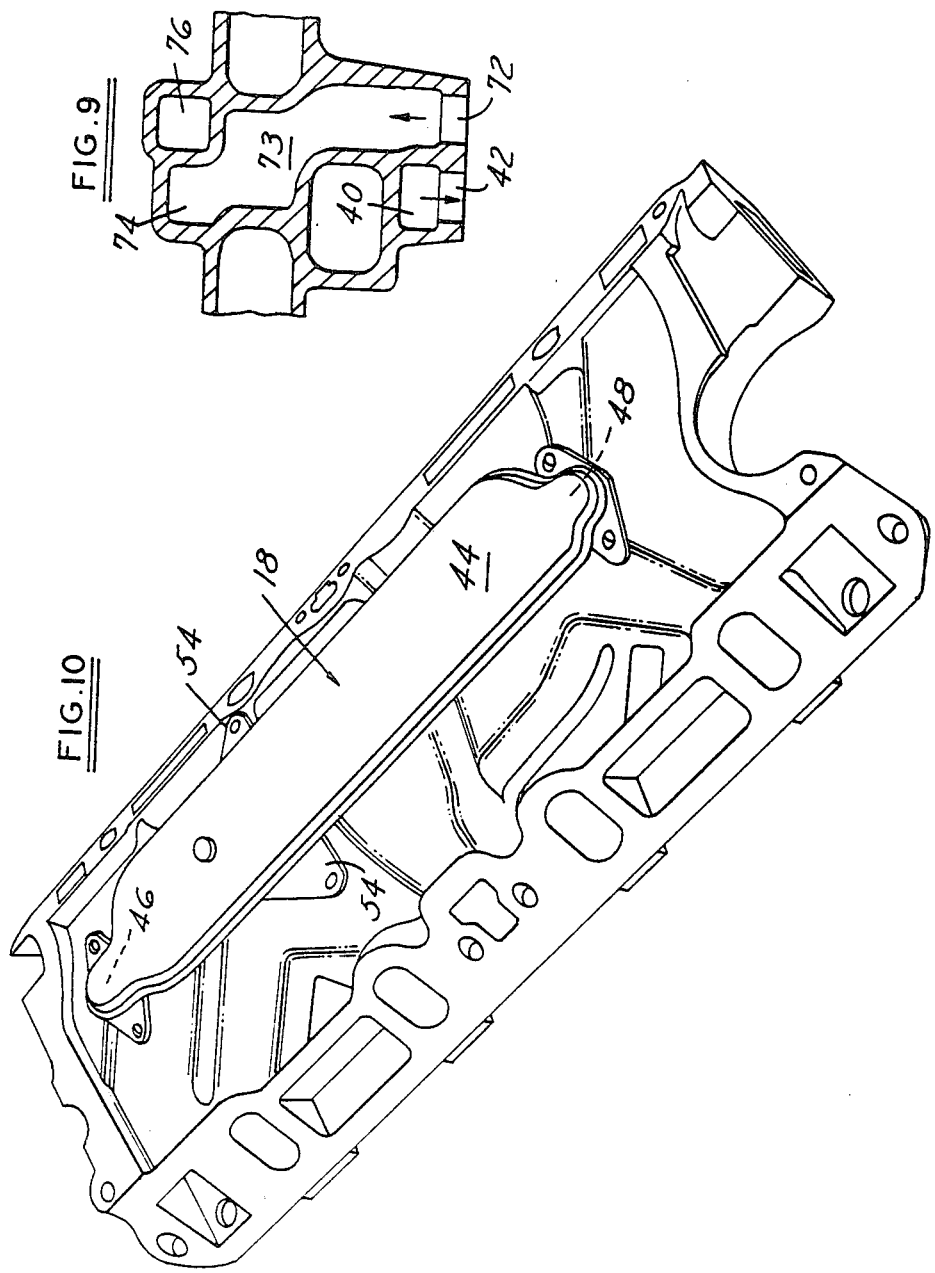

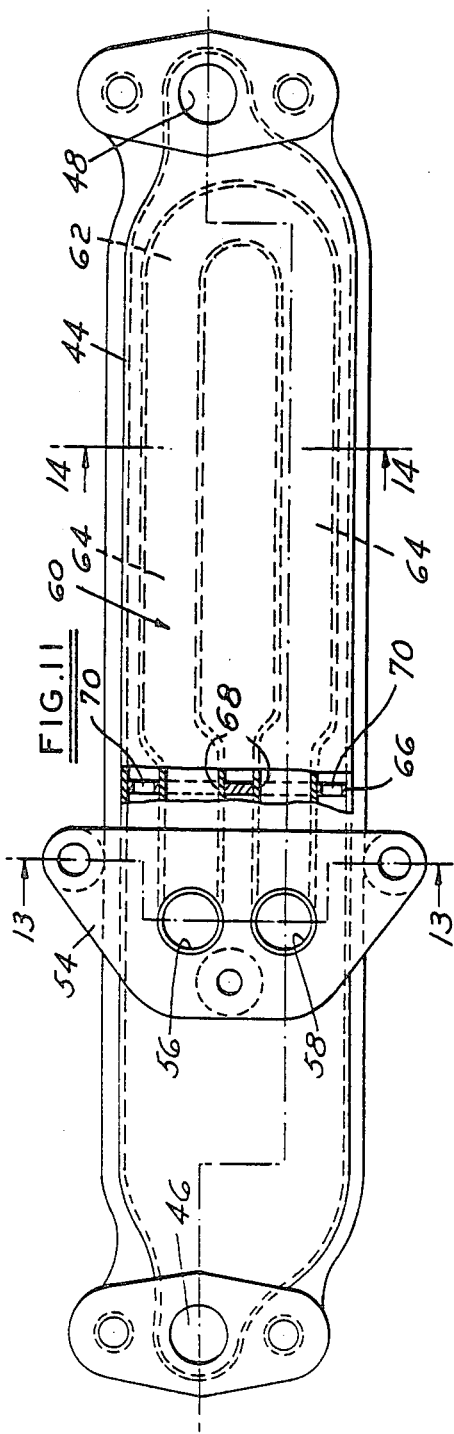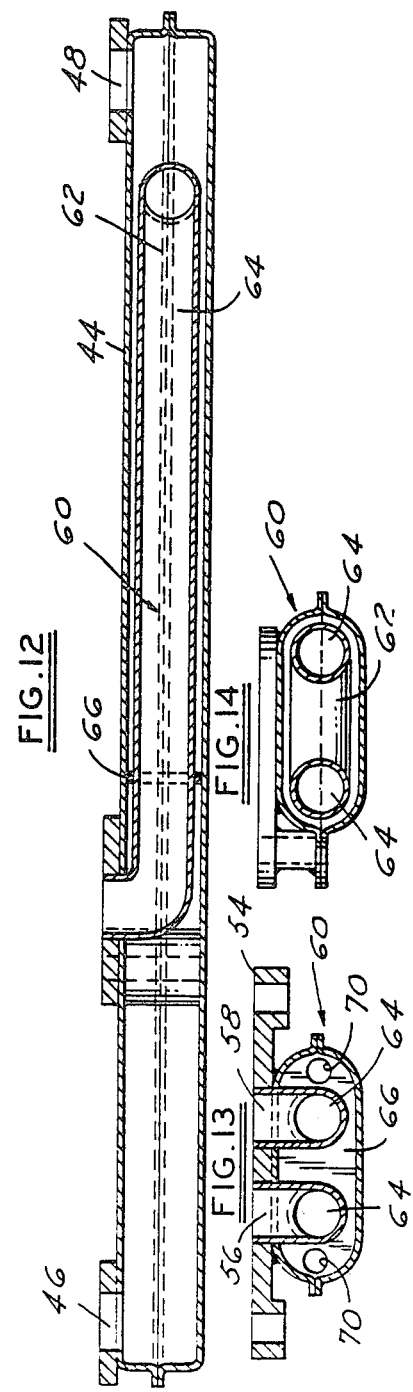

ENGINE EGR COOLER

This invention relates in general to an exhaust gas recirculation (EGR) system for an automotive type internal combustion engine. More particularly, the invention relates to an externally mounted heat exchanger for cooling the exhaust gases prior to their reentry into the engine, for less fuel evaporation and a better engine operating efficiency.

EGR coolers per se are not new. For example, U.S. Pat. No. 3,937,196, Cook, shows and describes an internally mounted EGR cooler. In this case, the intake manifold is specially designed to accept such a cooler, such design, therefore, being less simplified and economical than a conventional intake manifold with an externally mounted EGR cooler.

FIG. 1, for example, shows a known type of externally mounted EGR cooler 1 in which water or engine coolant is circulated between tubes 2 and 4 through the outer cylinder of the cooler that contains an internal cylinder through which exhaust gases flow from a tube 6 to a conduit 8 to be recirculated into the engine through an EGR valve 9. This system is typical of many of the externally mounted EGR coolers in that it is a mishmash of tubes, insulator socks, brackets, hoses, clamps and fittings providing an awkward arrangement.

This invention relates to an EGR cooler construction that is flat and compact, has good heat exchange with an engine coolant system, and can be mounted integral to an essentially conventional intake manifold on the underside thereof.

Other features, objects, and advantages of the invention will become more apparent upon reference to the succeeding detailed description thereof and to the drawings illustrating the preferred embodiment thereof; wherein, FIG. 1 is a view of an EGR cooler system known in the prior art;

FIG. 2 schematically illustrates, in exploded view form a V-8 type engine construction embodiying the invention;

Figure 7:
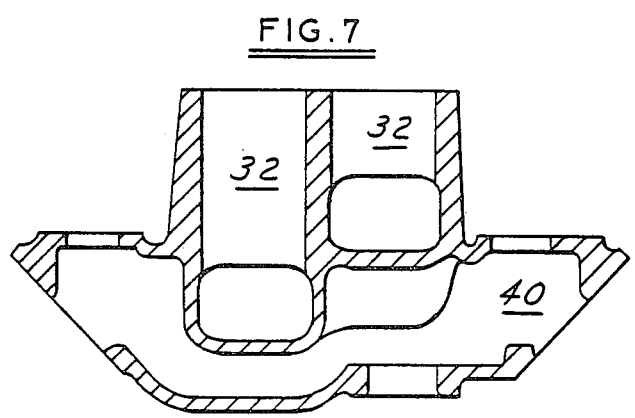
Figure 8:
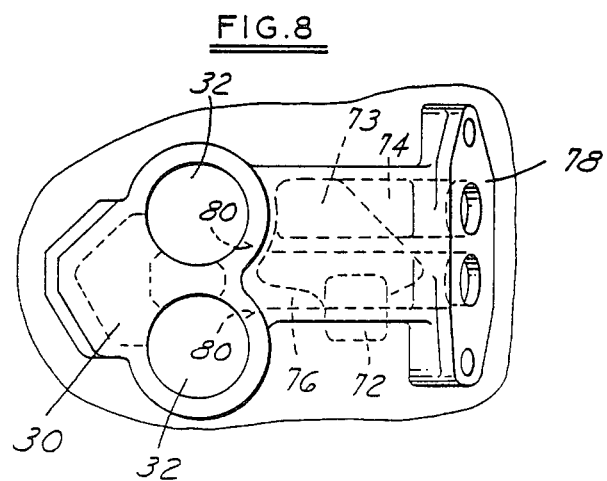
Figure 3:
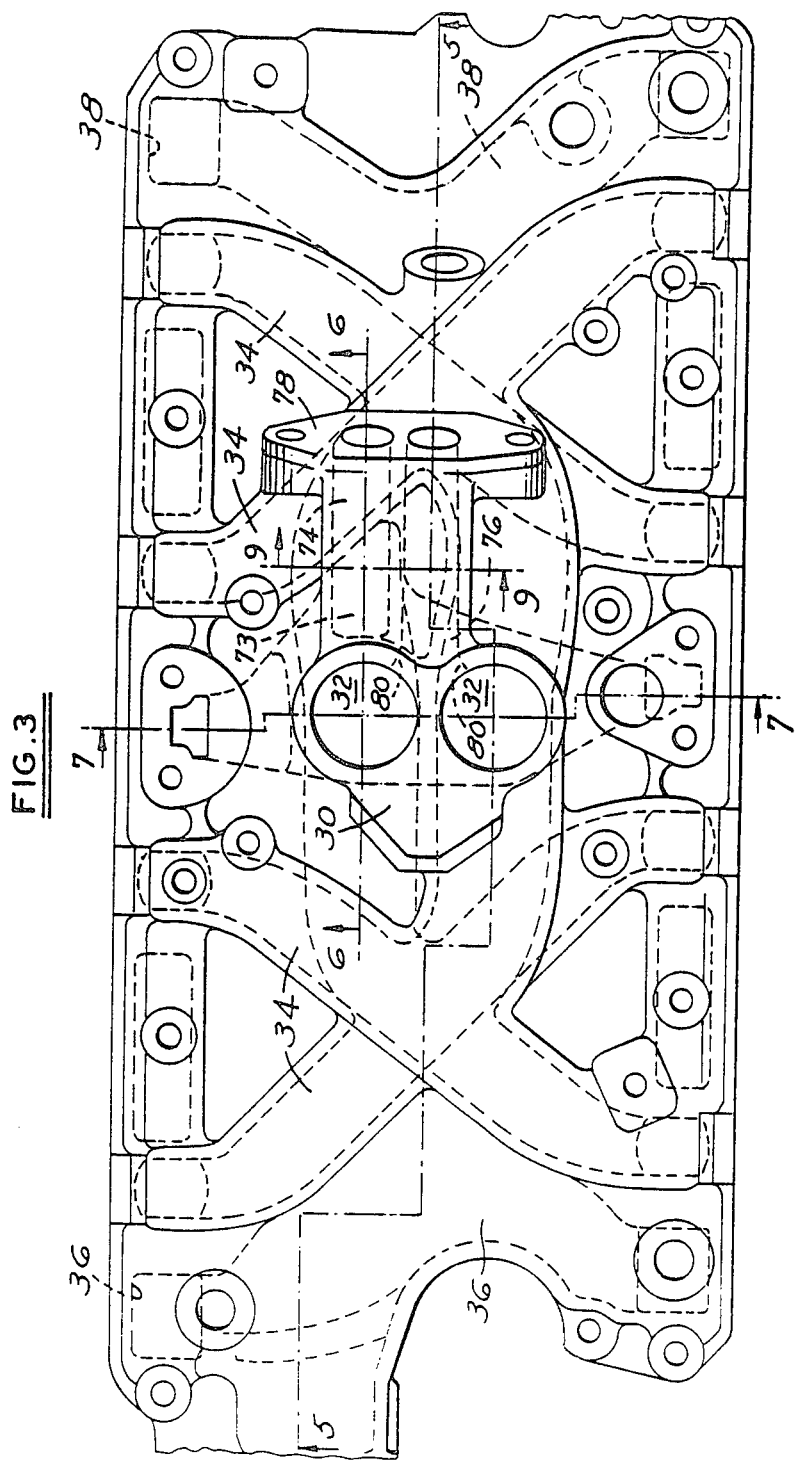
FIG. 3 is an enlarged top or plan view of the intake manifold shown in FIG. 2.

FIGS. 5 and 6 and 7 are cross-sectional views of portions of the intake manifold taken on planes indicated by and viewed in the direction of the arrows 5—5 and 6—6 and 7—7 of FIG. 3, and illustrating the path of movement of the EGR gases;

FIG. 8 is a reproduction of a portion of FIG. 3;

FIG. 9 is a cross-sectional view taken on a plane indicated by and viewed in the direction of the arrows 9—9 of FIG. 3;

FIG. 10 is a perspective view of the cooler installed on the intake manifold;

FIG. 11 is an enlarged plan view of the cooler shown in FIG. 10;

FIG. 12 is a longitudinal cross-sectional view taken on a plane indicated by and viewed in the direction of the arrows 12—12 of FIG. 11; and, FIGS. 13 and 14 are cross-sectional views taken on planes indicated by and viewed in the direction of the arrows 13—13 and 14—14, respectively, of FIG. 11.

The invention provides an EGR cooler that can be easily integrated into an existing V-8 type engine construction, without incorporating the usual hoses, clamps, tubes and other paraphenalia normally associated with externally mounted EGR coolers. In this instance, the EGR cooler is snugly received in a nesting manner beneath the intake manifold in the valley of the V-8 and cooperatingly constructed to coact with internal EGR passages in the intake manifold.

Figure 2:
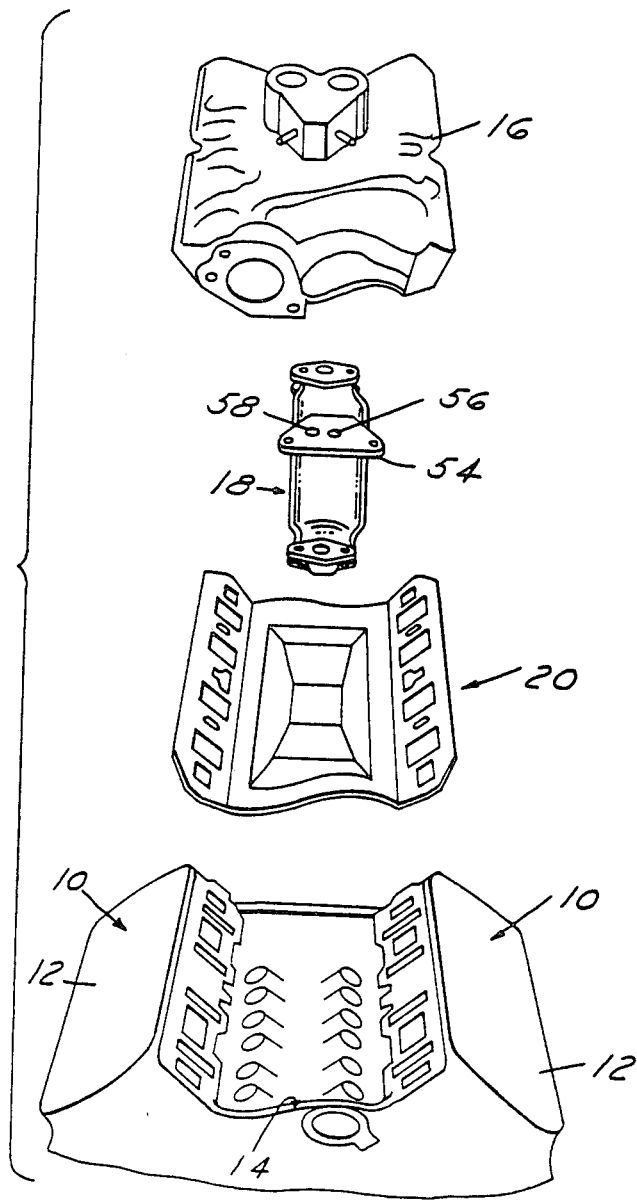

FIG. 2 illustrates in schematic exploded view form an automotive type internal combustion engine of the conventional V-8 type. It consists of the normal dual bank of engine cylinders or blocks 10 that are joined at their lower or bottom crankcase ends and spaced laterally from one another at their upper cylinder head assembly ends 12, as shown. This defines the usual valley 14 within which normally is mounted a single intake manifold 16 having passages for interconnecting the two cylinder blocks. In this case, as illustrated, a compact, flat sandwich type EGR cooler 18 is fitted inbetween the bottom of the intake manifold and a combination cover-gasket 20 normally provided for the valley. As will be described, the EGR cooler 18 is integrally mounted to the underside of the intake manifold and has passages for circulation of the engine coolant through it and around tubular members that contain the EGR gas to be recirculated into the engine, as previously described.

FIG. 3 is a top view of the intake manifold shown in FIG. 2. It contains the usual carburetor mounting flange 30 having two riser bores 32 for mating with the riser bores of the carburetor. The bores are connected to the conventional logs or runners 34 that connect at opposite edges to the cylinder heads of the engine for distribution of the air/fuel mixture from the carburetor into the engine proper. The manifold also contains front and rear water passages 36 and 38 for the flow of engine coolant between the cylinder blocks and heads in a known manner.

Figure 4:
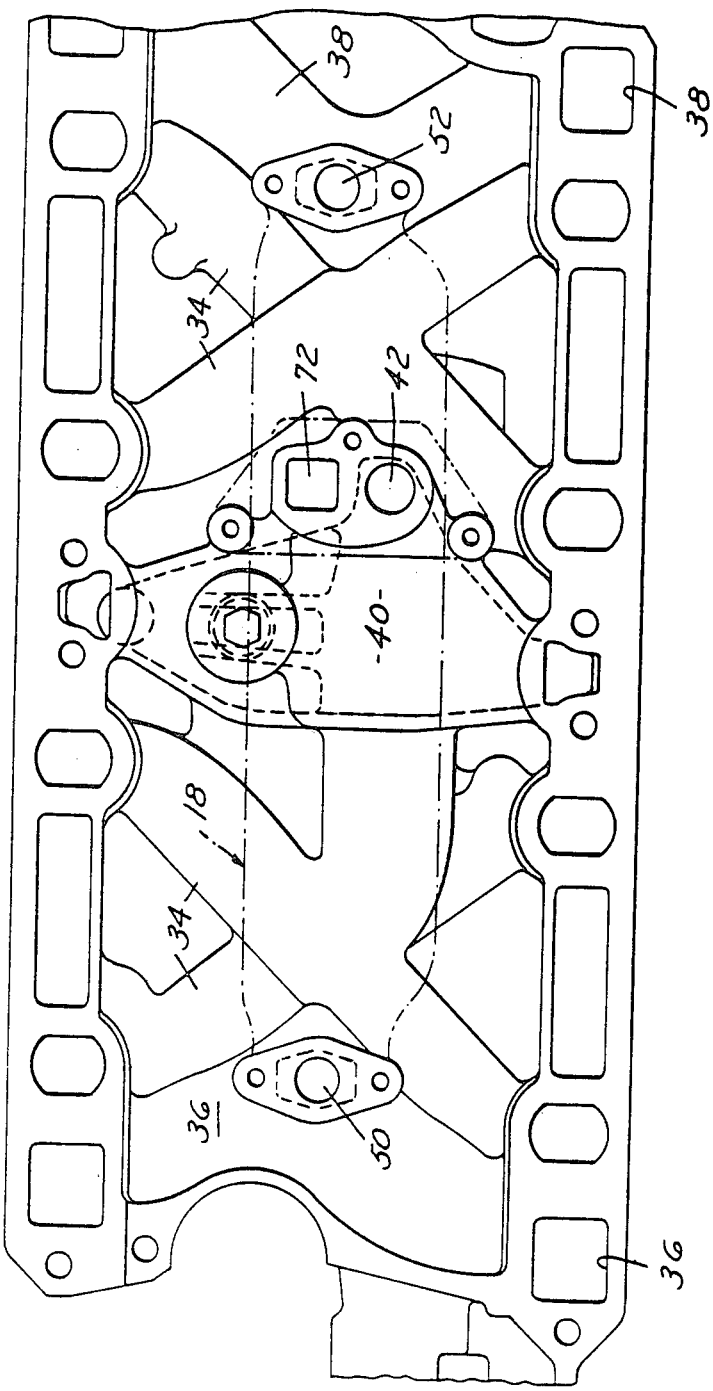
FIG. 4 is a bottom view of the intake manifold shown in FIG. 3, looking up.

As best seen in FIGS. 4, 5, and 7 the manifold also contains an exhaust gas crossover passage 40 connecting the exhaust gases from one bank of engine cylinder to the opposite bank, flowing directly beneath the carburetor riser bores for the purpose of evaporating the fuel prior to entry into the engine cylinders.

Exhaust gas recirculation (EGR) systems have been in use on automotive engine installations for many years. The usual construction is to tap the exhaust gas crossover passage for a supply of exhaust gases, and redirect this portion of the gases back into the engine intake manifold generally at a location between the lower portion of the carburetor and the inlet to the intake manifold. This use of recirculated exhaust gases lowers the combustion chamber pressure and temperature level to reduce the output of NOX. The use of hot exhaust gases, however, may cause an overheating of the air/fuel mixture flowing through the carburetor. Accordingly, the use of an EGR cooler may be desired so that the exhaust gases are cooled somewhat prior to their reentering the intake manifold for delivery to the engine's cylinders.

This invention is concerned with an EGR system that is essentially totally contained within the intake manifold, and an EGR cooler that is mounted integral to the manifold without the usual pertinences, so as to simplify the construction and provide better reliability.

Turning now to FIGS. 4–6 and 9, the EGR passage 40 is provided with an outlet or discharge opening 42 for the passage of EGR gases downwardly out of the intake manifold. Mounted directly to the underside of the intake manifold is a flat, sandwich-shaped EGR cooler 18 which, as best seen in FIGS. 10–14 has an elongated oblong type hollow casing 44 with flanged openings at opposite ends constituting an engine coolant inlet 46 and a coolant outlet 48. These openings are mounted directly over mating openings 52 and 50 in the coolant passages 38 and 36. The casing 44 also contains a third mounting flange 54 that contains a pair of openings 56 and 58. Secured within the openings are the open ends of a U-shaped tube 60 having an arcuately shaped base portion 62 and a pair of leg portions 64 extending from it. The side or leg portions are spaced laterally from each other by a partition-like combination support-spacer 66 that is fixedly secured within the casing 44 closely adjacent to the flange 54. The support-spacer 66 has a pair of spaced holes 68 through which are inserted the legs 64 of the U-shaped tube. A second set of arcuately shaped holes 70 is also provided to permit the flow of water or engine coolant in casing 44 from the inlet 46 to the outlet 48 past all portions of the tube 60. The tube is shown as tapering or diverging outwardly directly downstream of the support-spacer to provide a greater heat transfer or heat exchange between the engine coolant and the walls of the U-shaped tube.

The tube in this case is adapted to contain and flow exhaust gases from the EGR system totally contained within the intake manifold. The opening 56, therefore, is adapted to be aligned with the outlet 42 from the engine exhaust gas crossover passage 40, with the flange 54 being secured directly to the underside of the intake manifold. The opening 56 in the casing of the EGR cooler, therefore, constitutes an outlet for the flow of cooled exhaust gases into an opening 72 provided in the intake manifold for flow upwardly and diagonally through a passage 73, as indicated in FIG. 9. As seen in FIG. 8, the topside of the intake manifold is cored to provide a pair of essentially parallel passages 74 and 76 terminating in a mounting flange 78. Passage 73 is connected directly to the diagonal opening 74 to contain the cooled exhaust gases. Passage 76 on the other hand is connected through dual ports 80 directly into the carburetor riser bores. The exhaust gases in passage 74 are adapted to be connected at times with the passage 76 so that they then will flow into the riser bores and be circulated into the intake manifold and therethrough to the engine cylinders proper.

Figure 1:
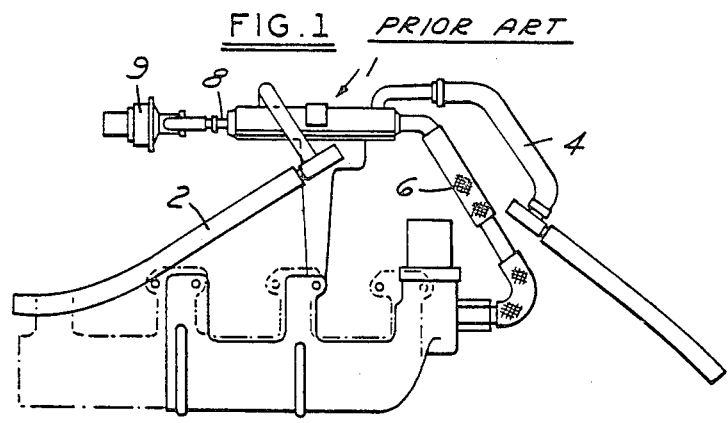

The mounting flange 78 in this case is adapted to support an EGR control valve (shown in FIG. 1) that would be movable either electronically or by vacuum or other suitable means to block or unblock communication between the two passages 74 and 76, in a known manner. In brief, the flow of exhaust gases generally is not desired during engine idle speed and wide open throttle conditions of operation of the engine, since at engine idle, the scavenging of exhaust gases is not as efficient is at off idle speeds of operation and at wide open throttle conditions of operation, the maximum power output is determined by the availability of oxygen. Accordingly, the EGR valve normally will close off the passage of EGR gases into the throttle riser bores at these times and schedule the flow of EGR gases generally only during off idle, load conditions of operation.

As thus described, therefore, it will be seen that the engine water or coolant, as the case may be, flows through the intake manifold passages 38 and out the opening 52 into the inlet 46 of the EGR cooler. The coolant then flows longitudinally through the casing 44 towards the coolant outlet 48, passing through the holes 70 to totally surround the legs and base of the U-shaped EGR cooler tube 60 and thereby provide a transfer of heat from the hot exhaust gases to the cooler engine coolant. The coolant then passes out into the water or coolant intake manifold passage 36 at the rear of the engine for continued flow to the engine radiator to be cooled and recycled for use again in the cooler and other portions of the engine. During this time, the exhaust gases flowing through the crossover passage 40 divert a portion of them into the outlet 42 and into the inlet 56 of the U-shaped tube. From there, the EGR gases flow around the circuit of the U-shaped tube and out the outlet 58 into the diagonally located passage 73 and into passage 74. If the EGR valve is in a condition of open operation, the exhaust gases will continue to flow by reason of the intake manifold vacuum into the throttle riser bores 32 through the openings 80.

FIGS. 11–14 illustrate more clearly the specific construction of the EGR cooler 18. As stated previously, it has three mounting flanges adapted to be attached to matingly shaped flanges formed on the intake manifold, the openings 56 and 58 cooperating with the inlet and outlet 42 and 72, respectively. FIGS. 13–14 more clearly shown the cross-sectional construction.

From the foregoing it will be seen that the invention provides an EGR cooler that can be mounted directly to the underside of the intake manifold of a V-8 type engine in the valley, thus providing a compact and simplified construction without additional brackets, hoses, fittings and clamps. The simplification of this design provides improved assembly reliability, lower assembly costs, reduced weight and improved EGR system and engine function. The EGR cooler and manifold integral system also provides an improved package that minimizes damage in engine shipment and in engine installation at the vehicle assembly plants.

While the invention has been shown and illustrated in its preferred embodiments, it will be clear to those skilled in the arts to which it pertains that many changes and modifications may be made thereto without departing from the scope of the invention.

We claim:

1. An engine exhaust gas recirculation (EGR) cooler for use in an internal combustion engine having an engine intake manifold, the intake manifold including passages therein defining an exhaust gas recirculation (EGR) system, the cooler comprising, a flat sandwich type casing mounted contiguous to the manifold and connected to both the engine coolant system and to the EGR system for cooling of the EGR gases by engine coolant, the casing being of tubular oblong shape connected at opposite ends to engine coolant passages in the manifold, and an essentially U-shaped tube mounted within the casing surrounded by coolant and having the open pair of end portions of the tube connected one to the EGR system to constitute an inlet for receiving EGR gases therein and the other connected to the EGR system to constitute an outlet for the discharge therefrom of the exhaust gases cooled by heat transfer to the coolant.

2. An EGR cooler as in claim 1, the coolant inlet and outlet being through the top portion of the casing essentially at right angles to the direction of coolant flow longitudinally through the cooler.

3. An EGR cooler as in claim 1, the coolant inlet and outlet and EGR gas inlet and outlet all being in the same plane and extending through that portion of the cooler contiguous with the manifold.

4. An EGR cooler as in claim 3, including a plurality of flange manifold mounting means fixed one to each of the coolant inlet and outlet and a further one to the EGR gas inlet and outlet connection to the EGR system.

5. An EGR cooler as in claim 1, the U-shaped tube having a pair of side leg portions extending from an arcuate base portion, the side portions flaring laterally away from one another at a location in the casing closer to the EGR gas inlet and outlet than to the base member to increase the coolant flow area between the side portions for a greater heat transfer.

6. An EGR cooler as in claim 4, including an upright tube support member secured within the casing adjacent the EGR gas inlet and outlet, the tube having a pair of leg portions secured to a base member, the support member having a first pair of laterally spaced openings each receiving therethrough one leg portion, the support member having a second pair of openings therethrough for the flow of coolant therethrough.

* * * * *